United States Patent [19]

Nakamats

[11] Patent Number: 4,490,765

[45] Date of Patent: Dec. 25, 1984

[54] DISKETTE FOR CLEANING A FLOPPY-DISC DRIVE HEAD

[76] Inventor: Yoshiro Nakamats, 1-10-1105, Minami Aoyama 5-chome, Minato-ku, Tokyo, Japan

[21] Appl. No.: 528,608

[22] Filed: Sep. 1, 1983

[51] Int. Cl.³ .................... G11B 23/02; G11B 5/016; G11B 5/10; G11B 5/12

[52] U.S. Cl. .................... 360/133; 360/99; 360/128

[58] Field of Search .............. 360/133, 137, 99, 135, 360/128, 86; 15/210 R

[56] References Cited

U.S. PATENT DOCUMENTS

| | | | |
|---|---|---|---|
| 4,106,067 | 8/1978 | Masuyama | 360/128 |
| 4,374,404 | 2/1983 | Davis | 360/99 |
| 4,375,658 | 3/1983 | Martinelli | 360/133 |

*Primary Examiner*—Robert Martin Kilgore
*Attorney, Agent, or Firm*—Andrus, Sceales, Starke & Sawall

[57] ABSTRACT

The present invention provides a cleaning diskette suitable for use in an apparatus including a floppy-disc drive head, a platen and a foam pad, the diskette including a jacket having folded flaps to form a flat envelope and a cleaning disc received in the jacket and having a central circular hole formed therein, the jacket including a central circular window aligned with the central circular hole of the cleaning disc and having a diameter slightly larger than that of the central circular hole, an elongated radial slot extending from a position corresponding to the outermost track of the floppy disc to a position corresponding to the innermost track of the same and through which the drive head contacts with the surface of the cleaning disc, at least one circular opening located adjacent to the edge of the central circular window in the jacket and substantially diametrically opposed to the radial slot, and at least one cleaning opening located in the area of the jacket with which the folded flaps of the jacket do not interfere and in which there are not the central circular window, radial slot and circular opening and in which the jacket does not contact with the platen and foam pad, the cleaning opening having a radial dimension substantially equal to the length of the radial slot.

1 Claim, 17 Drawing Figures

DISKETTE FOR CLEANING A FLOPPY-DISC DRIVE HEAD

The present invention relates to a diskette for cleaning the magnetic head in a drive by which a floppy disc is driven.

The magnetic head of the drive contacts with the surface of a floppy disc rotated at high speed for recording and play-back. Magnetic powder and binder produced by contacting the magnetic layer on the disc with the head be deposited on the drive head so that the gap in the head will be closed or the head will be separated from the disc surface to generate any errors in operation. The disc surface may be damaged by the roughed faces of the drive head. Thus, the head faces must frequently be cleaned.

It is however difficult to clean the head since it is assembled into the drive at a position which is difficult of access. It is therefore practical to clean the drive head by using a cleaning diskette mounted into the drive, the cleaning diskette including a jacket and a cleaning disc received in the jacket. The prior art cleaning diskettes have various disadvantages as will be described hereinafter.

Reference will be made to the prior art and the present invention in connection with the accompanying drawings in which.

First of all, some of the prior art cleaning diskettes will be described in connection with FIGS. 1 to 5.

Figure 1:
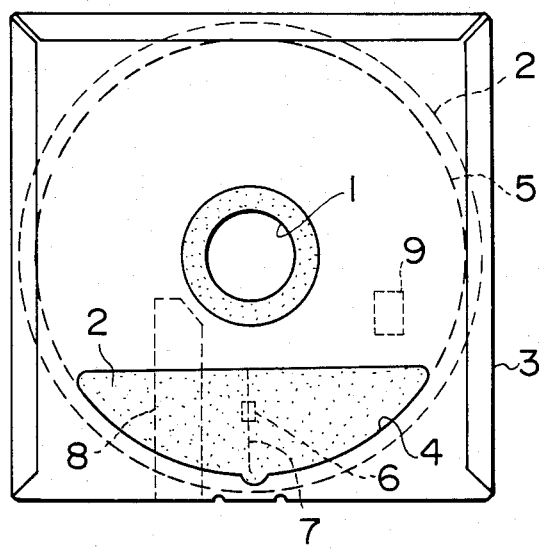
FIG. 1 is a plan view of a prior art cleaning diskette.

Referring to FIG. 1, there is herein shown a known cleaning diskette which comprises a cleaning disc 2 being white, and a jacket 3 in the form of a flat envelope which receives the cleaning disc 2. The jacket 3 includes a substantially crescentshaped cleaning opening 4 formed therein at one side. As seen from FIG. 1, the cleaning opening 4 does not extend completely between the outermost and innermost tracks of the cleaning disc 2. The conventional floppy-disc drive normally includes a head 6 used to record on and to play a floppy disc, and a platen 8 and foam pad 9 contacting with the opposite side of the jacket of the floppy disc to urge the floppy disc against the head 6. The cleaning diskette shown in FIG. 1 is opened at both the sides of a path 7 along which the head 6 is to move. Therefore, if the cleaning diskette is inserted into the drive, the platen 8 contacts directly with the surface of the cleaning disc 2 through the cleaning opening 4 of the jacket 3 so that the platen 8 will not only be worn but also contaminate the surface of the disc 2. The drive may also be damaged.

The cleaning opening 4 of the jacket 3 shown in FIG. 1 is not sufficiently utilized since the edge thereof does not reach the outermost and innermost tracks of the cleaning disc 2 to ensure that the jacket 3 can be maintained in strength.

Since the crescent-shaped opening 4 provides wet areas containing a cleaning liquid and dry areas containing no cleaning liquid in the radial direction, the head will irregularly be wiped by the cleaning disc 2.

Figure 2:
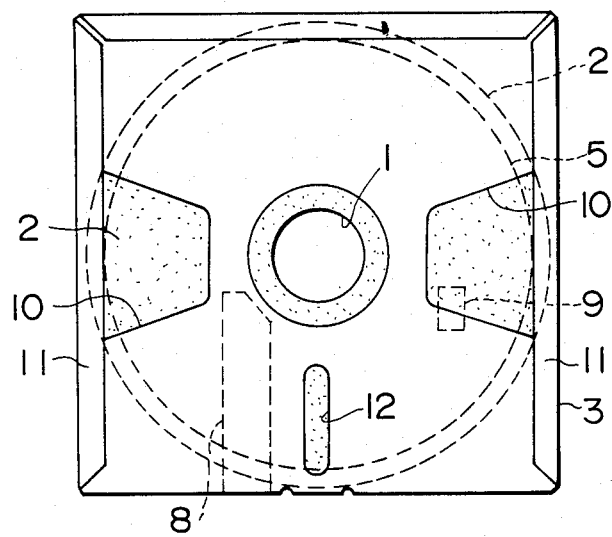
FIG. 2 is a plan view of another prior art cleaning diskette.

In order to overcome such disadvantages, it has been proposed that the jacket 3 is provided with two cleaning openings 10 as shown in FIG. 2. This structure is advantageous in that the platen will not contact with the cleaning disc 2. But the foam pad 9 will contact with the cleaning disc 2 to provide another problem. Furthermore, the outer edge of each of the openings 10 is closed by the folded flap 11 of the jacket 3 to decrease the effective cleaning area of the cleaning disc 2. The cleaning diskette shown in FIG. 2 is also disadvantageous in that the head of the drive is not loaded to clean it since the diskette has no index hole. In FIG. 2, reference numeral 12 denotes a radial slot through which the head can contact with the surface of the cleaning disc.

Figure 3:
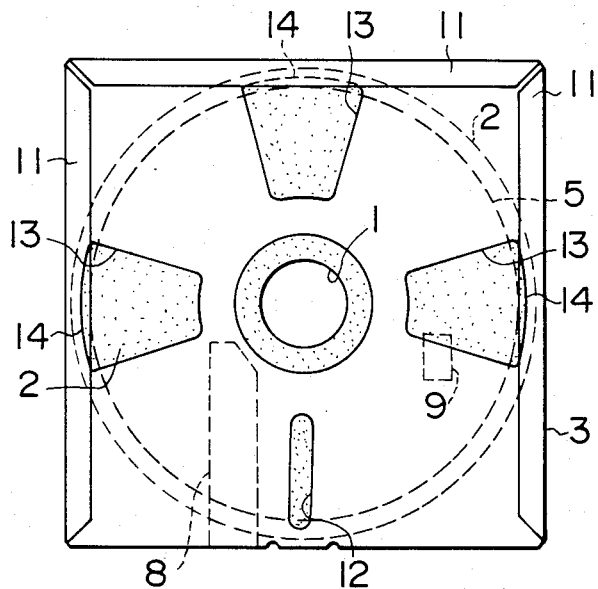
FIG. 3 is a plan view of a still another prior art cleaning diskette.

FIG. 3 shows a prior art cleaning diskette in which the jacket 3 includes sector-shaped cleaning openings 13 for completely cleaning the area of the disc 2 from the outermost track 5 to the innermost track. However, the jacket of this diskette is decreased in strength since the edge of each of the opening 13 extends or underneath the edge of the folded flap 11. And also the diskette has no index hole. Further, the cleaning disc 2 is engaged by part of the foam pad 9 through one of the cleaning openings 13.

Figure 4:
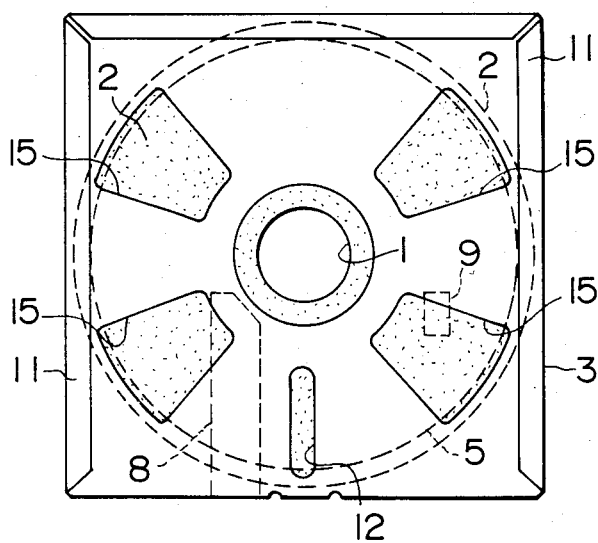
FIG. 4 is a plan view of a further prior art cleaning diskette.

FIG. 4 shows four cleaning openings 15 with which no folded flaps of the jacket 3 do interfere. In such a structure, the surface of the cleaning disc 2 is engaged by all the platen 8 and foam pad 9 in the drive, as shown in FIG. 4. Also, the jacket 3 is remarkably reduced in strength since there are many cleaning openings.

Figure 5:
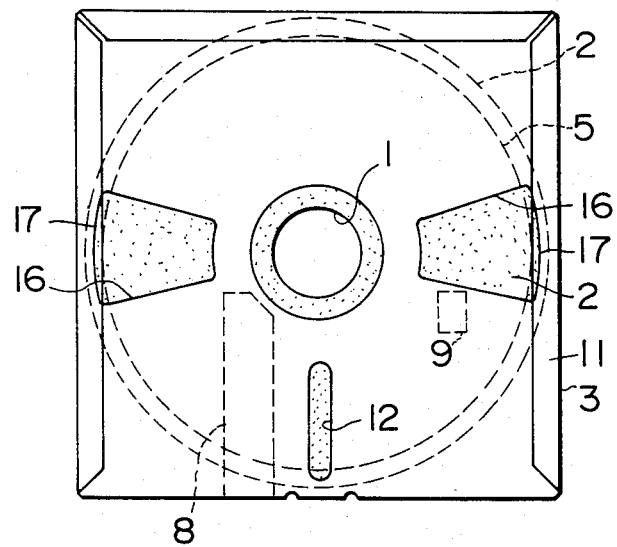
FIG. 5 is a plan view of a further prior art cleaning diskette.

FIG. 5 shows a cleaning diskette of the prior art in which the jacket 3 is provided with two cleaning openings 16 such that the cleaning disc 2 is not engaged either by the platen 8 or the foam pad 8. The outer edge of each of the cleaning openings 16 extends inwardly of or underneath the folded flap of the jacket 3 as shown by 17. Thus, the jacket 3 is remarkably reduced in strength.

Figure 6:
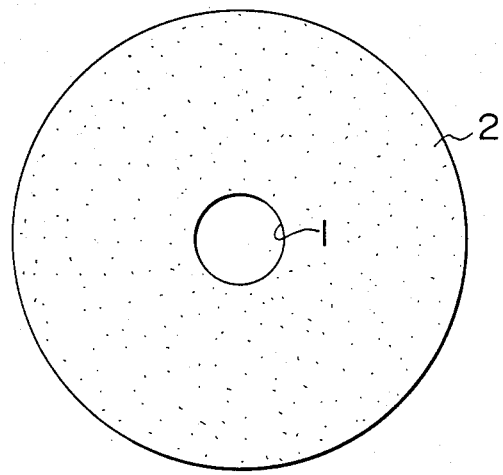
FIG. 6 is a plan view of the known cleaning disc.

The cleaning discs 2 used in the cleaning diskettes of FIGS. 1 to 5 is in the form of a circular sheet having its overall white surface and a central circular hole 1 formed therethrough, as shown in FIG. 6.

It is an object of the present invention to overcome all the disadvantages in the prior art cleaning diskettes.

The preferred embodiments of the present invention will now be described with reference to FIGS. 7 to 17 of the drawings.

Figure 7:
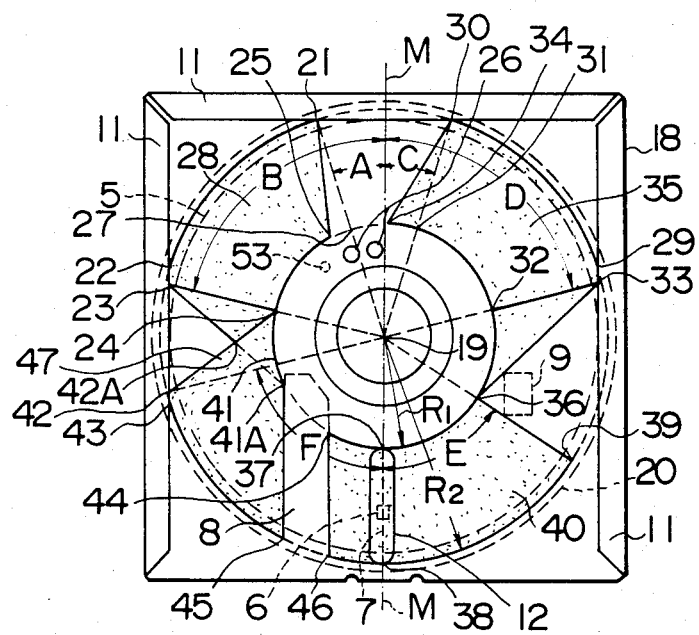
FIG. 7 illustrates various regions in which cleaning openings can be provided in accordance with the principle of the present invention.

FIG. 7 illustrates various areas of a jacket 18 in which at least one cleaning opening can be provided in accordance with the principle of the present invention. These areas are within an annulus having a radial dimension $(R_2-R_1)$ except the regions which correspond to the platen 8 and foam pad 9 and which are covered by the folded flaps 11 of the jacket 18, as stippled in FIG. 7. The radial dimension of the annulus corresponds to the length of the radial slot through which the head contacts with the cleaning disc. The stippled areas can be represented by various angles relative to a reference line M passing through the center 19 of the jacket 18, as will be described below.

The stippled areas includes a first area 28 equal to a sector having an angle B-A (70°-20°) and five corners 21, 22, 23, 24 and 27 minus a triangle region having three corners 21, 25 and 27 and located adjacent to circular openings 26 in the jacket 18; a second area 35 equal to a sector having an angle D-C (70°-20°) and five corners 29, 30, 31, 32 and 33 plus a triangular region having three corners 30, 34 and 31; a third area equal to a triangular region located between two sectors of angles D and E and having three corners 33, 36 and 32; a fourth area 40 equal to a sector of angle E (55°) having four corners 36, 37, 38 and 39; a fifth area equal to a sector of angle F having five corners 37, 41, 42, 43 and 38 minus a region having four corners 44, 41A, 45 and 46 which corresponds to the platen 8; and sixth area 47 equal to a sector between the sectors B and F minus a triangular region having three corners 23, 42 and 42A.

Figure 8:
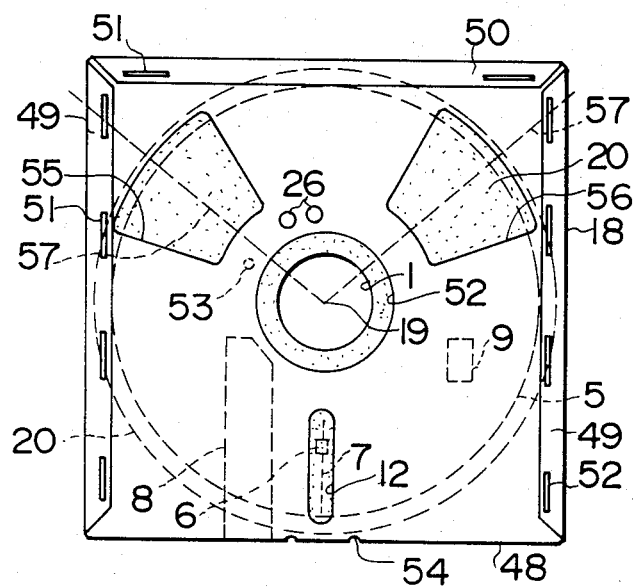
FIG. 8 is a plan view of a first embodiment of the cleaning diskette in accordance with the present invention.

FIG. 8 shows a cleaning diskette of the present invention which comprises a cleaning disc 20 having a central circular hole 1 and a jacket 18 receiving the cleaning disc 20. The jacket 18 has two cleaning openings 5 and 56 formed therein at positions corresponding to the first and second areas 28 and 35 shown in FIG. 7. The jacket 18 also has three folded flaps 49 and 50 which are heat-sealed thereto. The jacket 18 further includes a circular window 52 aligned with the central circular hole 1 on the cleaning disc 20 and having a diameter slightly larger than that of the central circular hole 1, two circular openings 26 each having a diameter slightly larger than that of an index hole 53 on the disc 20 and, positioned adjacent to the circular window 52 at a position substantially diametrically opposed to the radial head slot 12, and notches 54 for preventing the jacket 18 from being damaged when it is folded.

In the arrangement of FIG. 8, the jacket 18 cannot be reduced in strength since the edges of the cleaning openings 55 and 56 do not extend inwardly of the folded flaps 49 and 50. Also, the positions of the cleaning openings enable the cleaning disc 20 to be utilized completely in the range between the outermost and innermost tracks thereof. Further, the cleaning openings 55 and 56 will never be engaged by the platen 8 and foam pad 9.

Figure 9:
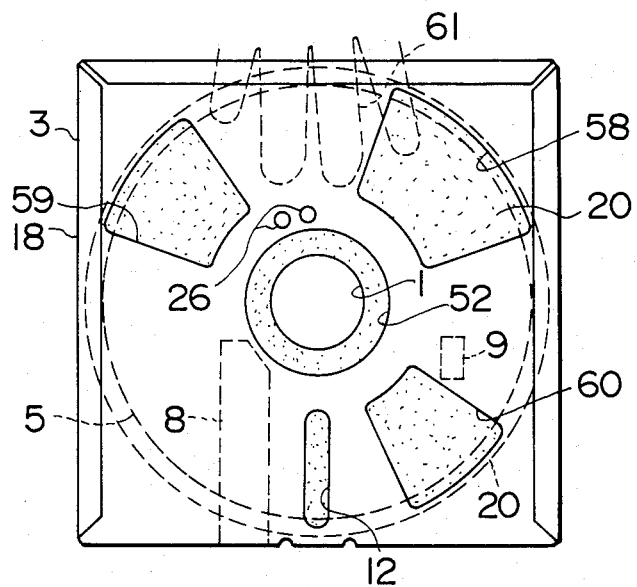
FIG. 9 is a plan view of a second embodiment of the cleaning diskette according to the present invention.

A cleaning diskette shown in FIG. 9 has a jacket 18 which includes three cleaning openings 58, 59 and 60 formed therein at positions corresponding to the first, second and fourth areas 28, 35 and 40 shown in FIG. 7. The cleaning opening 58 is larger than the other cleaning openings 59 and 60. The three cleaning openings 58, 59 and 60 provide each three of dry and wet regions to increase the cleaning effect of the cleaning diskette.

Figure 10:
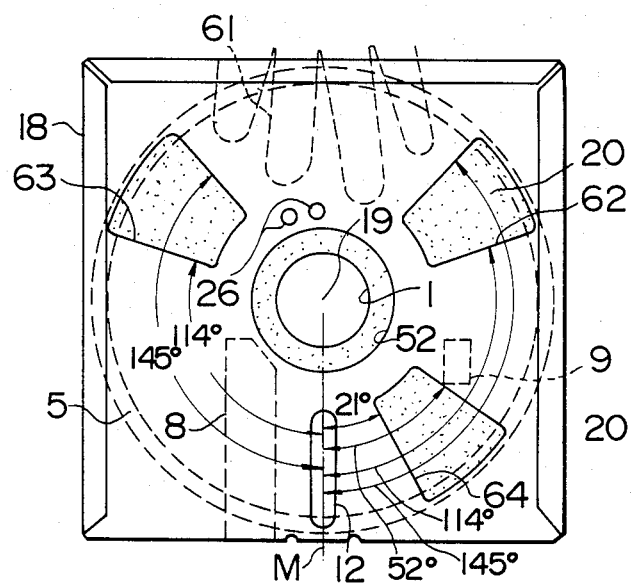
FIG. 10 is a plan view of a third embodiment of the cleaning diskette according to the present invention.

FIG. 10 shows a cleaning diskette having three cleaning openings 62, 63 and 64 which are formed in the jacket 18 such that the fingers 61 of a user will not engage with the cleaning disc 20 through the cleaning openings when the cleaning diskette is inserted into the drive. The side edges of the cleaning openings 62, 63 and 64 are defined by various angles relative to the reference line M.

Figure 11:
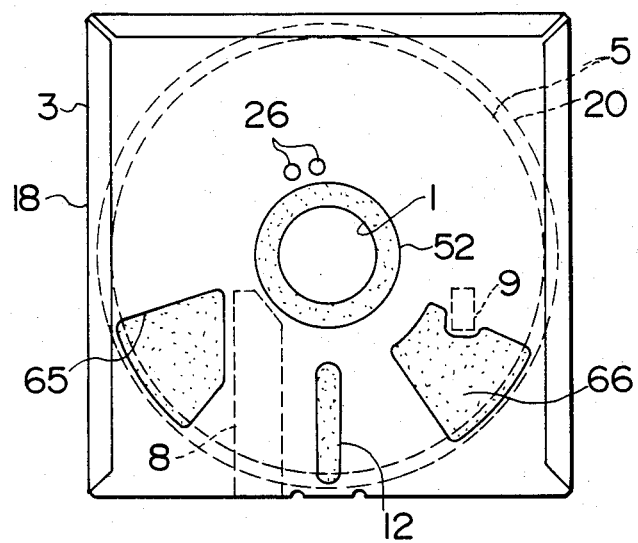
FIG. 11 is a plan view of a fourth embodiment of the cleaning diskette according to the present invention.

FIG. 11 shows a cleaning diskette having two cleaning openings 65 and 66 formed in the jacket 18 at positions corresponding to the fourth and fifth areas in FIG. 7 which will never be engaged by the fingers of a user.

Figure 12:
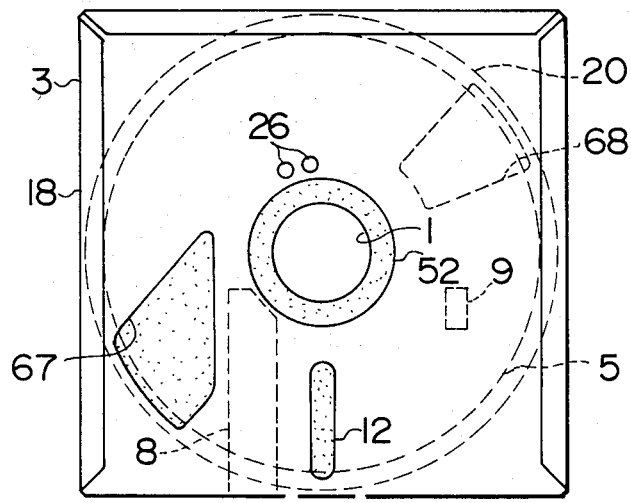
FIG. 12 is a plan view of fifth embodiment of the cleaning diskette according to the present invention.

FIG. 12 shows a cleaning diskette having a cleaning opening 67 formed in the jacket 18 at a position corresponding to the fifth area in FIG. 7. Another cleaning opening 68 may be formed in the jacket 18 at a position corresponding to the second area 35 in FIG. 7.

Figure 13:
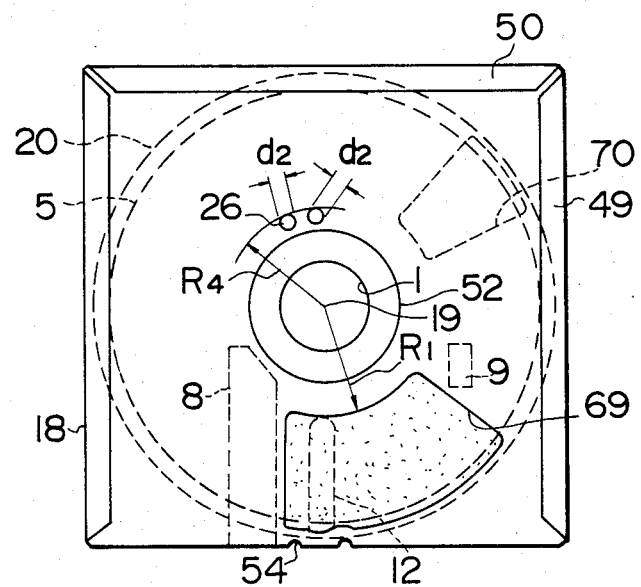
FIG. 13 is a plan view of a sixth embodiment of the cleaning diskette according to the present invention.

FIG. 13 shows a cleaning diskette having a cleaning opening 69 formed in the jacket 18 at a position corresponding to the fourth area 40 and part of the fifth area in FIG. 7. Another cleaning opening 70 may be formed in the jacket 18 at a position corresponding to the second area 35 in FIG. 7.

Figure 14:
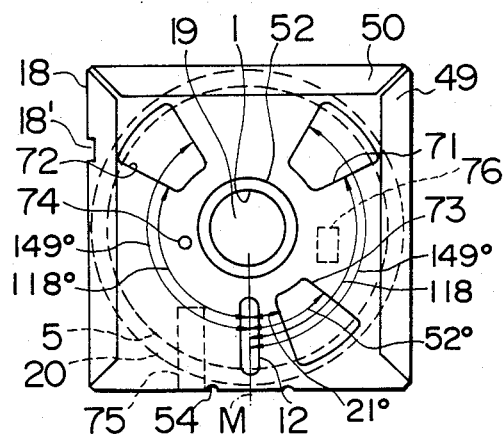
FIG. 14 is a plan view of a seventh embodiment of the cleaning diskette according to the present invention.

The embodiments shown in FIGS. 8 to 13 each utilizes a so-called maxi-diskette having each side of 8 inches. FIG. 14 shows a cleaning diskette called a mini-diskette having each side of 5.25 inches and which includes three cleaning openings 71, 72 and 73 formed in the jacket 18 at positions corresponding to the first, second and fourth areas 28, 35 and 40 shown in FIG. 7.

The side edges of the cleaning openings 71, 72 and 73 are defined by various angles relative to the reference line M. The jacket 18 has only one circular opening 74 rather than two circular openings. The positions of the platen and foam pad are shown by 75 and 76, respectively. Reference numeral 18' denotes a write inhibit notch used to prevent a disc 20 from being wrongly re-recorded when this notch 18' is covered with a label after the disc 20 has been once recorded.

Figure 16:
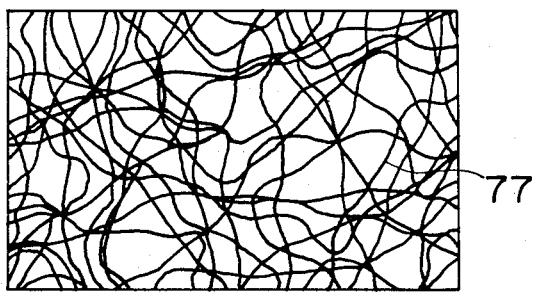
FIG. 16 is an enlarged fragmentary view showing the construction of the cleaning disc used in the present invention.
Figure 17:
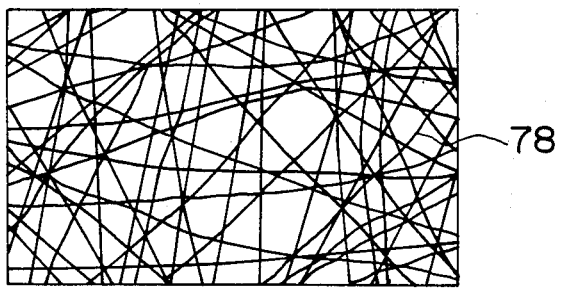
FIG. 17 is a view similar to FIG. 16, showing the other costruction of the cleaning disc used in the present invention.

The cleaning disc 20 used in the present invention may be a circular non-woven sheet comprising 100% polyester filaments which are randomly arranged and self-bonded to one another at intersections under heat and pressure. FIG. 16 and 17 are enlarged fragmentary views of the cleaning disc in the magnification of 50 times. FIG. 16 shows crimped filaments 77 while FIG. 17 shows straight filaments 78 of the same denier bonded to one another.

Such a cleaning disc has 3.0 OZ/YD$^2$ (about 102 g/m$^2$) of bases weight, 60-65 pounds (27-30 kg) of clamping strength and 40% (straight filament) - 107% (crimped filament) of elongation at breakage. Further, the cleaning disc has higher energy absorption, longer effective life and higher tear propagation strength. The cleaning disc has clearly cut edges and superior permeability. Since the cleaning disc is made of 100% polyester filaments, it is excellent in dimensional stability to moisture because there is only 0.5% of moisture at 98% of relative humidity. At its wet condition, the cleaning disc is less shrunk to maintain it rigid. The cleaning disc has superior resistances to degradation due to mold or the like and to weathering, and is proof against an increased temperature in the range of 177° C. to 210° C.

In addition, the cleaning disc is highly chemical-resistant relative to both the acid and alkali in the range of pH 0,1 to pH 10, and has very excellent resistance to organic solvents such as hydrocarbon, alphatic alcohols, ketone, and has better resistance to inert halogen solvents such as carbon trichloride, carbon tetrachloride and the like. If the cleaning disc is made of crimped filaments at its bases weight of 6.0 OZ/YD$^2$ (203 g/m$^2$), it can withstand 3600 of frictions at load of 500 g in a taper type abrasion machine.

Thus, the cleaning disc used in the present invention has characteristics suitable for wiping the head when the disc is wetted with a cleaning liquid.

The cleaning liquid is a chemical liquid which will not attack either the disc 20 or head 6, such as Freon TF of low boiling point, Freon TF containing 9% of isopropyl alcohol, a mixture consisting of 91% isopropyl alcohol and 9% water or the like. The cleaning liquid is poured onto the surface of the cleaning disc 20 through the cleaning openings in the jacket to provide radial dry and wet regions alternately in the circumferential direction of the disc. When the cleaning diskette of the present invention is inserted into the drive and then rotated while contacting with the head 6 through the radial head slot 12, the head 6 is wiped alternately by the dry and wet regions to remove any contamination therefrom as the head is being moved along the length of the radial head slot 12.

Figure 15:
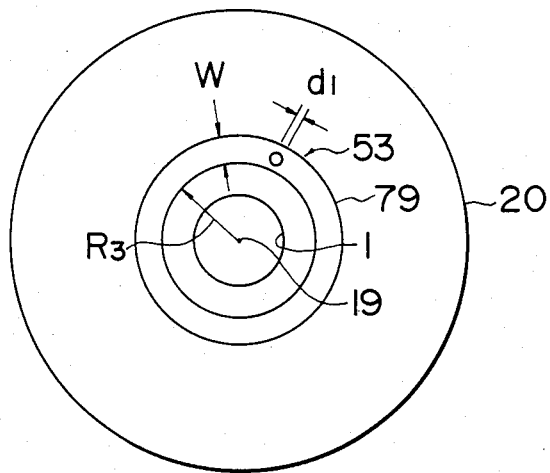
FIG. 15 is a plan view of a cleaning disc according to the present invention.

In accordance with the present invention, the cleaning disc 20 may be provided with an annular black-colored ring 79 including an index hole 53 formed therein, as shown in FIG. 15, if the cleaning disc 20 is made of a light-transmissive or reflective material. Thus, the rotational position of the disc can more effectively be detected by the drive.

Supposing that the diameter of the index hole 53 is $d_1$; the width of the black ring 79 is W; the radial distance from the center 19 of the disc 20 to the innermost edge of the cleaning opening is $R_1$; the radial distance between the center 19 of the disc 20 and the inner edge of the black ring 79 is $R_3$; and the radial distance from the center 19 of the disc 20 to the outer edge of the circular opening 26 formed in the jacket 18 is $R_4$, there are the following relationships:

$d_1 \leq d_2 \leq W$ $R_4 \leq R_3 + W \leq R_1$.

Although the embodiments of the present invention have been described as to the provision of substantially sector-shaped cleaning openings, the cleaning opening may be formed in many different shapes such as circle, oval and others. The number of the cleaning openings may freely be selected without departing from the principle of the present invention.

I claim:

1. A cleaning diskette comprising a rectangular jacket (18) with a central window (52) and an annular cleaning disc (20) therewithin and having a center hole (1) aligned with and smaller than said window (52), said diskette being suitable for use in a floppy disc drive apparatus having:

(1) a floppy disc drive head (6), (2) an elongated platen (8) adapted to extend from an edge of an inserted diskette to adjacent the jacket central window (52) and generally tangential to the disc center hole (1), (3) and a foam pad (9) spaced arcuately from the side of said drive head (6) remote from said platen (8) and generally transversely across from the inner terminus of said platen (8), (4) said platen (8) and foam pad (9) being positioned to be disposed on the side of an inserted diskette jacket (18) opposite from said head (6) to urge the jacket toward the drive head (6); said cleaning diskette further comprising, in combination:

(a) folded flaps (11) on at least some of the sides of said jacket (18) to form a flat envelope, (b) an elongated radial slot (12) extending through said jacket (18) and exposing said cleaning disc (20) for engagement on one side of said jacket by the said drive head (6), said slot extending from the outermost to the innermost track of said disc, (c) at least one circular opening (26) extending through said jacket (18) and disposed adjacent the edge of said central window (52) for registering with an index hole (53) on said disc (20), (d) a plurality of cleaning openings (55–56, 58–60, 62–73) disposed on the opposite of said one side of said jacket (18) and with said cleaning openings extending radially a distance generally equal to the length of said radial slot (12); said openings being disposed on a disc radius line (57, FIG. 8) which extends other than perpendicular to the sides of said rectangular jacket (18), (e) characterized in that said cleaning openings (55–56, 58–60, 62–73) are out of registry with said folded flaps (11), said central window (52), said radial slot (12) and said circular opening (26) of said jacket (18); and furthermore are positioned to be out of registry with said elongated tangential platen (8) and said arcuately spaced foam pad (9) when the platen and pad urge said jacket toward said drive head (6).

* * * * *

UNITED STATES PATENT AND TRADEMARK OFFICE
CERTIFICATE OF CORRECTION

PATENT NO. : 4,490,765
DATED : December 25, 1984
INVENTOR(S) : YOSHIRO NAKAMATS

It is certified that error appears in the above-identified patent and that said Letters Patent is hereby corrected as shown below:

In Column 1, line 12, after "with the head" insert
--tend to--

In Column 2, line 48, after "extends" insert
--inwardly of--

In Column 3, line 41, delete "5" and substitute therefor
--55--

Signed and Sealed this

Seventh Day of May 1985

[SEAL]

Attest:

DONALD J. QUIGG

Attesting Officer Acting Commissioner of Patents and Trademarks